United States Patent
Iyer et al.

(10) Patent No.: US 10,775,249 B2
(45) Date of Patent: Sep. 15, 2020

(54) FLEXIBLE DRIVE SHAFT TEST ARRANGEMENTS

(71) Applicant: Goodrich Corporation, Charlotte, NC (US)

(72) Inventors: Raghu Iyer, New Hartford, NY (US); Timothy H. Barber, Marcy, NY (US)

(73) Assignee: Goodrich Corporation, Charlotte, NC (US)

( * ) Notice: Subject to any disclaimer, the term of this patent is extended or adjusted under 35 U.S.C. 154(b) by 197 days.

(21) Appl. No.: 15/853,583

(22) Filed: Dec. 22, 2017

(65) Prior Publication Data
US 2019/0195708 A1    Jun. 27, 2019

(51) Int. Cl.
| | |
|---|---|
| *G01L 3/06* | (2006.01) |
| *F16H 59/16* | (2006.01) |
| *G01M 13/026* | (2019.01) |
| *G01M 13/027* | (2019.01) |
| *G01M 13/025* | (2019.01) |
| *F16H 1/32* | (2006.01) |

(52) U.S. Cl.
CPC ............... *G01L 3/06* (2013.01); *F16H 59/16* (2013.01); *G01M 13/025* (2013.01); *G01M 13/026* (2013.01); *G01M 13/027* (2013.01); *F16H 1/32* (2013.01)

(58) Field of Classification Search
CPC .. F16H 59/16; F16H 1/32; G01L 3/06; G01M 13/026
See application file for complete search history.

(56) References Cited

U.S. PATENT DOCUMENTS

| | | | | |
|---|---|---|---|---|
| 4,294,112 A | * | 10/1981 | Moore | G01M 13/026 73/162 |
| 6,651,519 B2 | * | 11/2003 | Wilks | G01L 3/109 73/862.08 |
| 7,571,643 B2 | * | 8/2009 | Sugiura | E21B 7/062 73/152.46 |
| 8,375,809 B2 | * | 2/2013 | Power | G01L 3/1407 73/862.325 |
| 9,366,598 B2 | * | 6/2016 | Mancarella | G01M 13/02 |
| 2006/0070461 A1 | | 4/2006 | Delair et al. | |

(Continued)

FOREIGN PATENT DOCUMENTS

DE    4111057 C1    4/1992

OTHER PUBLICATIONS

Partial European Search Report dated May 22, 2019, issued during the prosecution of European Patent Application No. EP 18214676.1.
(Continued)

*Primary Examiner* — Jamel E Williams
(74) *Attorney, Agent, or Firm* — Locke Lord LLP; Scott D. Wofsy; Joshua L. Jones

(57) ABSTRACT

A flexible drive shaft test arrangement includes a drive end piece arranged along a rotation axis, a driven end piece axially offset from the drive end piece along the rotation axis, and a shell. The shell connects the drive end piece to the driven end piece. The drive end piece end is offset in rotation about the driven end piece to internally load a flexible drive shaft disposed within the shell with torsion. Test stands and methods for testing flexible drive shafts are also disclosed.

19 Claims, 3 Drawing Sheets

(56) References Cited

U.S. PATENT DOCUMENTS

2008/0290247 A1* 11/2008 Ussery .................... F16D 3/68
  248/678
2014/0326060 A1* 11/2014 Mancarella ........... G01M 13/02
  73/115.02

OTHER PUBLICATIONS

Extended European Search Report dated Oct. 21, 2019, issued during the prosecution of corresponding European Patent Application No. EP 18214676.1.

* cited by examiner

FLEXIBLE DRIVE SHAFT TEST ARRANGEMENTS

BACKGROUND OF THE INVENTION

1. Field of the Invention

The present disclosure relates to mechanical power transmission, and more particularly test arrangements for flexible drive shafts used in mechanical power transmissions.

2. Description of Related Art

Drive shafts are commonly used in vehicles and in stationary applications to transmit mechanical power while accommodating misalignment. Since misalignment can influence reliability and expected service life of drive shafts, testing can be required to demonstrate that a specific flexible drive shaft design can perform reliably in a contemplated application while subject to the application operating conditions, e.g., misalignments, rotational speed, and torsional load. Testing is typically performed in a test cell equipped to apply torsional load rather than actual application due to the expense of testing in an actual application.

Torsional loads are generally applied externally using specialized equipment. For example, some test cells employ a dynamometer or friction belt to resist drive shaft rotation, resistance to rotation from the dynamometer or friction belt externally applying torque to the drive shaft, the resistance to rotation typically being overcome by a suitably sized electric motor. Other test cells employ hydraulics to generate torque, so-called 'four-square' test cells for example applying hydraulic power through gearboxes as an external source of torque. The external torque sources generally increase the size, complexity, and/or the cost of the test cell.

Such conventional test arrangements and methods have generally been considered satisfactory for their intended purpose. However, there is still a need in the art for improved flexible drive shaft test arrangements, test stands for flexible drive shafts, and methods of testing flexible drive shafts. The present disclosure provides a solution for this need.

SUMMARY OF THE INVENTION

A flexible drive shaft test arrangement includes a drive end piece arranged along a rotation axis, a driven end piece axially offset from the drive end piece along the rotation axis, and a shell. The shell connects the drive end piece to the driven end piece. The drive end piece end is offset in rotation about the driven end piece to internally load a flexible drive shaft disposed within the shell with torsion.

In certain embodiments, a flexible drive shaft can be arranged along the rotation axis. The drive end piece can couple the flexible drive shaft to the shell. The driven end piece can couple the flexible drive shaft to the shell. The drive end piece can be offset in rotation about the rotation axis relative to the driven end piece to exert torsion on the flexible drive shaft. The flexible drive shaft can include a flexible coupling. The flexible coupling having a plurality of flexible diaphragm disks. Axially adjacent flexible diaphragm disk can be connected to one another at their respective radially outer rim portions or hub portions.

In accordance with certain embodiments, the flexible drive shaft can include first and second flexible couplings connected to one another by a shaft. The tube body can have shell flanges arranged on axially opposite ends of the tube body. The drive end piece can include a flexible member. The flexible member can be configured to connect to the shell. The flexible member can include a flexible diaphragm. The flexible diaphragm can extend about the rotation axis. The flexible diaphragm can connect to the shell at a radially outer rim portion.

It is also contemplated that, in accordance with certain embodiments, the drive end piece can include a drive flange. The drive flange can be axially offset from an axil end of the shell. The drive end piece can include a spline. The spline can be disposed outside of the shell. A male spline can extend axially from an interior of the shell to the exterior of the shell. A female spline can be arranged outside of the shell and configured to receive the male spline.

A test stand for flexible drive shaft includes a flexible drive shaft test arrangement as described above. A flexible drive is disposed within the shell and is internally loaded in torsion by rotational offset between the drive end piece and the driven end piece. A rotation source is operably connected to the flexible drive shaft and is configured to rotate the a flexible drive shaft test arrangement about the rotation axis. A bearing arrangement rotatably supports the flexible drive shaft arrangement and subjects the flexible drive shaft to axial and/or angular misalignment.

In certain embodiments the flexible drive shaft can be rotationally fixed relative the driven end piece. The flexible drive shaft can be rotationally fixed relative to the drive end piece. The driven end piece and the drive end piece can each be rotationally fixed relative to the shell.

A method of testing a flexible drive shaft includes, at a test arrangement for a flexible drive shaft as described above, offsetting the drive end piece relative to the driven end piece about the rotation axis to apply torsion to a flexible drive shaft disposed within the shell. The drive end piece is then fixed in rotation about the rotation axis relative to the driven end piece to retain the applied torsion in the flexible drive shaft.

In certain embodiments the test arrangement can be rotated about the rotation axis. The flexible drive shaft can be subjected to axial misalignment. The flexible coupling can subjected to angular misalignment. The flexible drive shaft can be subject to both axial misalignment and angular misalignment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
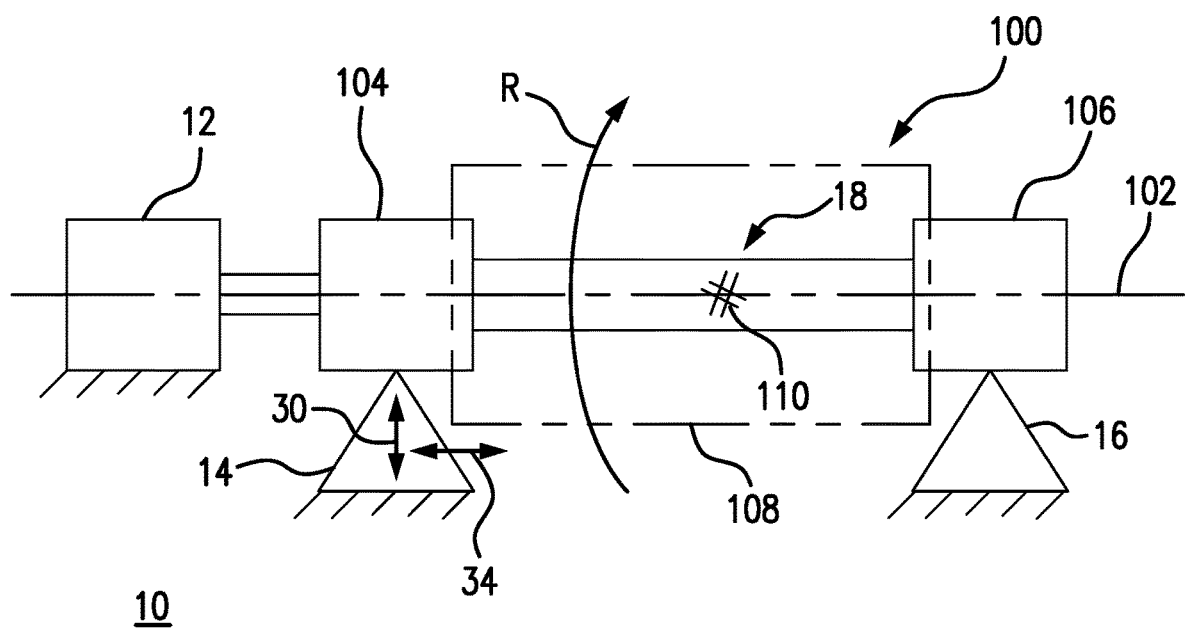
FIG. 1 is a schematic view of an exemplary embodiment of a test arrangement for a flexible drive shaft constructed in accordance with the present disclosure, schematically showing a flexible drive shaft fixed at opposite ends to a shell of the test arrangement and internally loaded with torsion.

Reference will now be made to the drawings wherein like reference numerals identify similar structural features or aspects of the subject disclosure. For purposes of explanation and illustration, and not limitation, a partial view of an exemplary embodiment of a flexible drive shaft test arrangement in accordance with the disclosure is shown in FIG. 1 and is designated generally by reference character 100. Other embodiments of flexible drive shaft test arrangements, test stands for flexible drive shafts, and methods of testing flexible drive shafts in accordance with the disclosure, or aspects thereof, are provided in FIGS. 2 and 3, as will be described. The systems and methods described herein can be used for internally applying and retaining torsion to flexible drive shafts for testing, such as in test stands without an external source of torsion, though the present disclosure is not limited to test stands without external sources of torsion or to flexible drive shaft testing in general.

Referring to FIG. 1, a test stand 10 for a flexible drive shaft, e.g., flexible drive shaft 18, is shown. Test stand 10 includes rotation source 12, a drive-end bearing 14, and a driven-end bearing 16. Driven-end bearing 16 and drive-end bearing 14 support a flexible drive shaft test arrangement 100 for rotation about a rotation axis 102. Rotation source 12 is operably connected to flexible drive shaft test arrangement 100 and is configured for rotating R flexible drive shaft test arrangement 100 about rotation axis 102. Rotation source 12 can include an electric motor by way of non-limiting example.

Flexible drive shaft test arrangement 100 includes a drive end piece 104, a driven end piece 106, and a shell 108. Drive end piece 104 is arranged along rotation axis 102. Driven end piece 106 is axially offset from drive end piece 104 along rotation axis 102. Shell 108 connects drive end piece 104 to driven end piece 106. Drive end piece 104 is offset in rotation about rotation axis 102 relative to the driven end piece 106 to internally load a flexible drive shaft 18 disposed within shell 108 with torsion 110.

Torsion 110 is applied flexible drive shaft 18 by twisting an 'A' end of flexible drive shaft 18 relative to a 'B' end of flexible drive shaft 18 about rotation axis 102 prior to fixing drive end piece 104 to shell 108. The twisting loads flexible drive shaft 18 with torsion 110 as a pre-load to flexible drive shaft 18 within flexible drive shaft test arrangement 100, allowing the test arrangement to thereafter be placed in test stand 10 pre-loaded with torsion 110. This eliminates the need to load flexible drive shaft 18 with torsion during testing, allowing for use of test stands without provisioning for applying torsion to flexible drive shafts during testing.

Drive-end bearing 14 is configured for subjecting a flexible drive shaft 18 to misalignment. In this respect drive-end bearing 14 can be arranged for translation along rotation axis 102 relative to driven-end bearing 16 to subject flexible drive shaft 18 to an axial misalignment 34. Drive-end bearing 14 can be arranged for movement in a direction orthogonal relative to rotation axis 102 to subject flexible drive shaft 18 to angular misalignment 30. It is also contemplated that drive-end bearing 14 can arranged for both translation along rotation axis 102 relative to driven-end bearing 16 and movement in a direction orthogonal relative to rotation axis 102, thereby subject flexible drive shaft 18 to both axial misalignment 34 and angular misalignment 30.

As will be appreciated by those of skill in the art in view of the present disclosure, subjecting flexible drive shaft 18 to axial and/or angular misalignment 30 during rotation and while carrying torsion 110 can be advantageous during validation of flexible drive shaft 18, where demonstration of reliability under application conditions is necessary. Although described herein in the context of drive-end bearing 14 movement, it is to be understood and appreciated that misalignment can also be induced by moving driven-end bearing 16 and/or movement of both drive-end bearing 14 and driven-end bearing 16.

Figure 2:
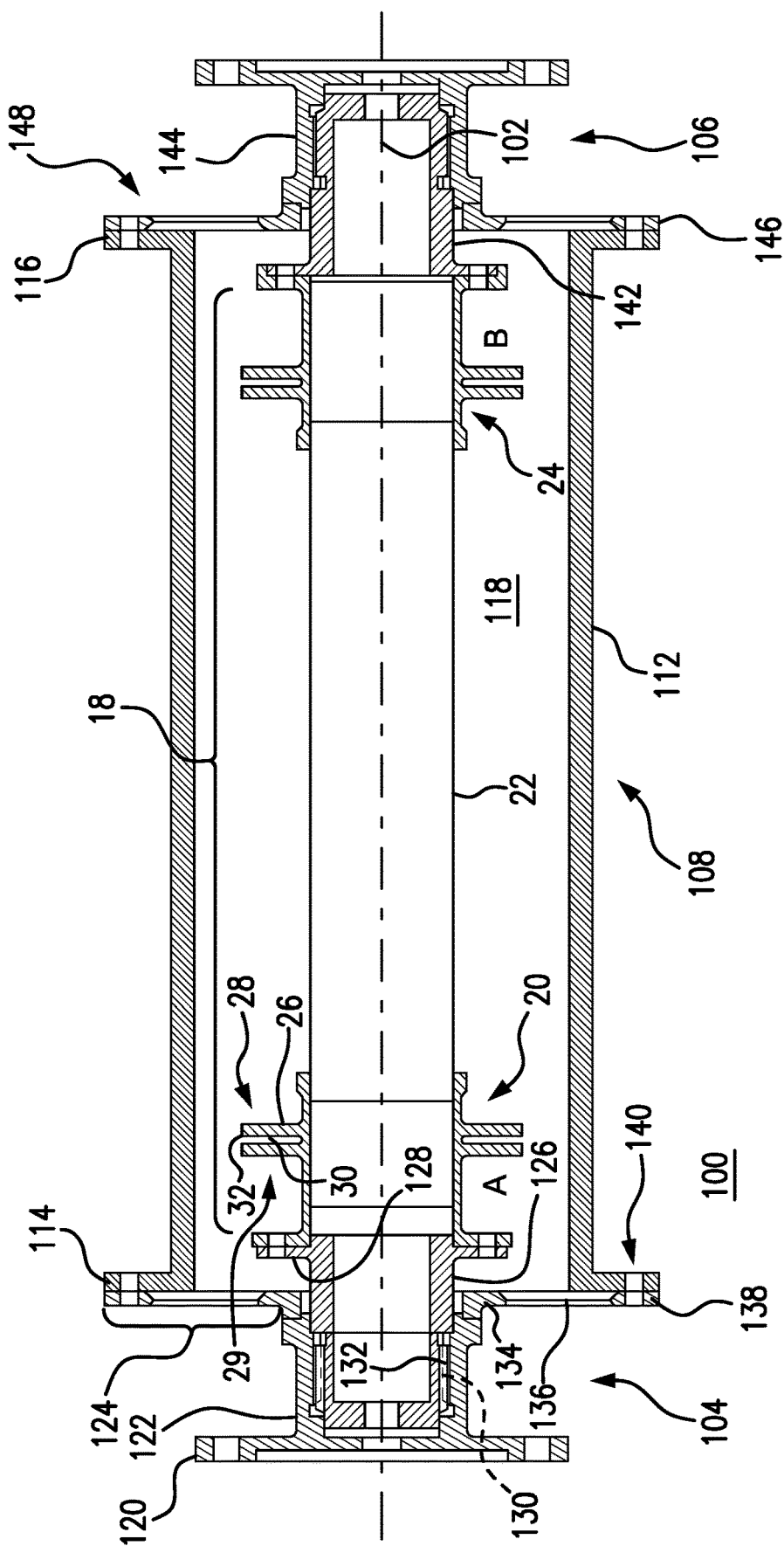
FIG. 2 is a cross-sectional side view of an exemplary embodiment of the test arrangement of FIG. 1, showing the flexible drive shaft disposed within the shell interior and rotationally fixed to the shell by a drive end piece and a driven end piece.

With reference to FIG. 2, flexible drive shaft test arrangement 100 is shown. Flexible drive shaft test arrangement 100 includes drive end piece 104, flexible drive shaft 18, driven end piece 106 and shell 108. Flexible drive shaft coupling 18 includes a first flexible coupling 20, a shaft 22, and a second flexible coupling 24. Second flexible coupling 24 is connected to first flexible coupling 20 by shaft 22 for rotation about rotation axis 102 as a flexible drive shaft assembly.

First flexible coupling 20 includes a first flexible diaphragm 26 with a radially outer rim 28 and second flexible diaphragm 30 with a radially outer rim 32. Radially outer rim 32 of second flexible diaphragm 30 is connected to radially outer rim 28 of first flexible diaphragm 26. First flexible diaphragm 26 and second flexible diaphragm 30 form a first pair of flexible diaphragms and a second pair of flexible diaphragms 29 are arranged adjacent to the first pair of flexible diaphragms in a similar manner at an axially offset location. Together, the two pairs of flexible diaphragms are arranged along rotation axis 102 between shaft 22 and drive end piece 104. Second flexible coupling 24 is similar to first flexible coupling 20 and is arranged along rotation axis 102 at an axially opposite end of shaft 22 relative to first flexible coupling 20, and is connected to shaft 22. Examples of suitable flexible couplings include those described in U.S. Pat. No. 5,158,504 to Stocco et al., issued on Oct. 27, 1992, the contents of which are incorporated by reference herein in their entirety.

Shell 108 includes a tube body 112 having a drive-end flange 114 and a driven-end flange 116. Tube body 112 bounds a hollow interior 118 that extends between axially opposite ends of tube body 112. Drive-end flange 114 extends about radially outer portion of tube body 112 at a first end of tube body 112. Driven-end flange 116 extends about a radially outer portion of tube body 112 at an axially opposite second end of tube body 112.

Hollow interior 118 is sized to receive within interior of shell 108 the entirety of flexible drive shaft 18 for internal application of torsion 110 to flexible drive shaft 18. As used herein internal application of torsion 110 means that flexible drive shaft 18 receives torsion 110 by flexible drive shaft test arrangement 100 statically. No external device like a dynamometer or friction belt is required to apply torsion by resisting rotation of flexible drive shaft 18. It is contemplated that tube body 112 be substantially rigid relative to flexible drive shaft 18, i.e., that torsion of magnitude equivalent to torsion 110 (shown in FIG. 1) not result in appreciable deformation (twisting) of tube body 112 about rotation axis 102. Tube body 112 can constructed from a metallic material, such as aluminum or steel alloy, to render tube body 112 suitably rigid.

Drive end piece 104 includes an outer drive flange 120, a sleeve 122, a flexible member 124, a spindle 126, and an inner drive flange 128. When assembled as shown in FIG. 2, outer drive flange 120 is disposed outside of shell 108 and extends about rotation axis 102. It is contemplated that outer drive flange 120 be configured to connect flexible drive shaft test arrangement 100 to rotation source 12 for rotating flexible drive shaft 18, loaded with torsion 110, and contained within flexible drive shaft test arrangement 100. Connection of outer drive flange 120 to rotation source 12 can be, for example, through a fastener pattern configured for rotationally fixing flexible drive shaft arrangement 100 relative to a rotary element of rotation source 12.

Sleeve 122 is connected on a first end to outer drive flange 120. On an axially opposite second end sleeve 122 is connected to flexible member 124. Within its interior sleeve 122 has a female spline 130, female spline 130 being configured to fix sleeve 122 in rotation relative to spindle 126 while leaving sleeve 122 axially free relative to spindle 126. In this respect inner drive flange 128 is connected to spindle 126 within hollow interior 118, inner drive flange 128 in turn fixing flexible drive shaft 18 to drive end piece 104. On a radially outer surface spindle 126 has a male spline 132, which extends radially outward, and which is configured to be received within female spline 130. Engagement of male spline 132 within female spline 130 fixes flexible drive shaft 18 in rotation relative to drive end piece 104.

Flexible member 124 includes a hub 134, a flexible diaphragm 136, and a rim 138. Hub 134 extends circumferentially about spindle 126, is radially offset therefrom, and connected to the end of sleeve 122. Flexible diaphragm 136 extends radially outward from hub 134 to rim 138, which is arranged at a location radially outward of flexible drive shaft 18. Rim 138 is configured to removably connect drive end piece 104 to shell 108, such as with bolts seated in a fastener pattern 140 cooperatively defined by drive-end flange 114 and rim 138.

As will be appreciated by those of skill in the art in view of the present disclosure, in addition to allowing for assembly of flexible drive shaft test arrangement 100, removable fixation of rim 138 to drive-end flange 114 allows drive end piece 104 to be offset in rotation about rotation axis 102 relative to driven end piece 106 to load flexible drive shaft 18 in torsion, e.g., with torsion 110 (shown in FIG. 1). It is contemplated that flexible diaphragm 136 have a profile configured to accommodate misalignment between drive end price 104 and shell 108 during rotation, thereby subjecting flexible drive shaft 18 to axial misalignment 34 and/or angular misalignment 30. Examples of suitable profiles of flexible diaphragm 136 include those described in U.S. Pat. No. 5,158,504 to Stocco et al., issued on Oct. 27, 1992, the contents of which are incorporated by reference herein in their entirety as stated above.

Driven end piece 106 is similar to drive end piece 104 with the difference that driven end piece 106 is connected to shell 108 axially at an end of shell 108 opposite drive end piece 104. More specifically, a rim 146 of a driven end flexible member 148 connects to driven-end flange 116 of shell 108 such that rim 146 is fixed in rotation relative to shell 108. Flexible drive shaft 18 is slidably received within driven end piece 106 such that second flexible coupling 24 is fixed in rotation relative to driven end sleeve 144 of driven end piece 106, flexible drive shaft 18 thereby being captive (but receptive to twisting about rotation axis 102) between drive end piece 104 and driven end piece 106.

As described herein flexible drive shaft 18 is loaded with torsion 110 (shown in FIG. 1) by offsetting drive end piece 104 relative to shell 108 and driven end piece 106 in rotation about rotation axis 102. This is for illustration purposes only and is non-limiting. Those of skill in the art will appreciate that, in view of the present disclosure, that flexible drive shaft 18 can be loaded with torsion 110 (shown in FIG. 1) by offsetting driven end piece 104 relative to shell and drive end piece 104 in rotation about rotation axis 102, as suitable in a contemplated application.

Figure 3:
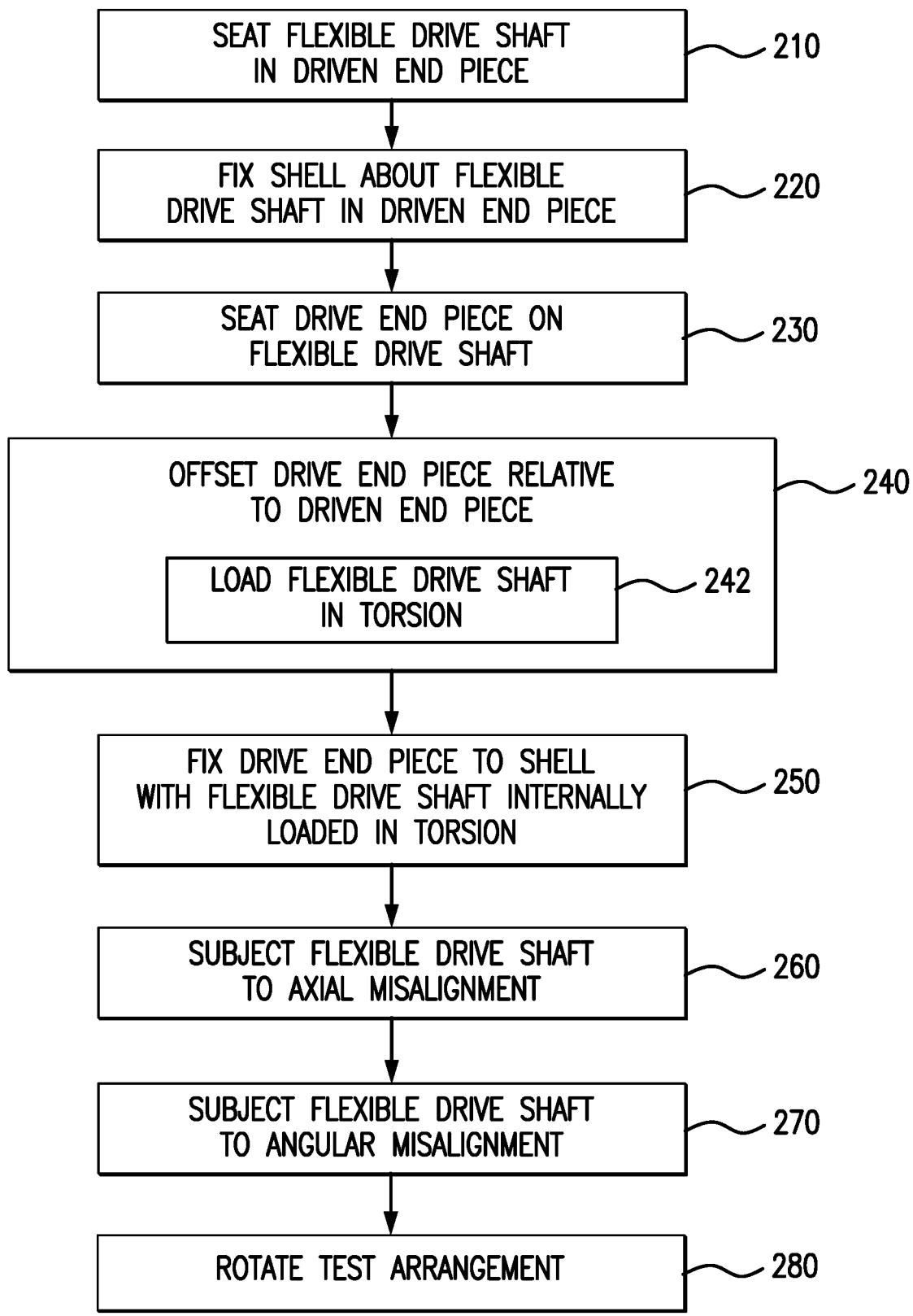
FIG. 3 is a block diagram of a method a testing a flexible drive shaft, showing steps of the method of testing a flexible drive shaft.

With reference to FIG. 3, a method 200 of testing a flexible drive shaft, e.g., flexible drive shaft 18 (shown in FIG. 1), is shown. For testing the flexible drive shaft the flexible drive shaft is assembled into flexible drive shaft arrangement 100 (shown in FIG. 1). In particular, the spindles of the end pieces of fastened to the flexible drive shaft. More particularly, drive end spindle 126 (shown in FIG. 2) is fastened to first flexible coupling 20 (shown in FIG. 2) and driven end spindle 142 is fastened to second flexible coupling 24.

Next, the flexible drive shaft is seated in the driven end piece, as shown with box 210. Seating the flexible drive shaft in the driven end piece entail sliding the driven end piece spindle (to which the flexible drive shaft is fastened) into the drive end piece sleeve, e.g., then driven end piece sleeve 144 (shown in FIG. 2). As will be appreciated, sliding the driven end piece spindle into the driven end piece sleeve fixes the driven end piece sleeve in rotation relative to the driven end piece sleeve by engagement of the male and female splines of the driven end piece sleeve and driven end piece sleeve.

As shown with box 220, the shell is then fixed about the flexible drive shaft and with the driven end piece. Specifically, the shell, e.g., shell 108 (shown in FIG. 1), is registered about the flexible drive shaft and translated along the rotation axis, e.g., rotation axis 102 (shown in FIG. 2), until the driven-end flange of the shell, e.g., driven-end flange 116 (shown in FIG. 2), comes into abutment with the rim of the driven-end flexible member, i.e., rim 146 (shown in FIG. 2). The shell is then fixed axially and in rotation relative to the rim, such as by fasteners received within a fastener pattern defined by the driven-end flexible member rim and driven-end mounting flange.

Next, the drive end piece sleeve, e.g., sleeve 122 (shown in FIG. 2), is slidably engagement to the flexible drive shaft. This entails sliding the drive end piece sleeve over the drive end piece spindle (which is fastened to the flexible drive shaft). More particularly, the drive end piece sleeve is registered in rotation about the rotation axis until the female and male splines of the sleeve and spindle are in alignment, and the drive end sleeve thereafter translated along the rotation axis until the rim of the drive end flexible member, e.g., rim 138 (shown in FIG. 2), comes into abutment with the drive-end flange, e.g., drive-end flange 114 (shown in FIG. 2). This leaves the drive end piece rotationally free relative to the shell and rotationally fixed relative to the flexible drive shaft (via the drive end spindle).

As shown with box 240, the drive end piece, e.g., drive end piece 104 (shown in FIG. 1), is then offset relative to the driven end piece. In particular, the drive end piece is offset in rotation about the rotation axis relative to the shell, and therethrough the driven end piece, by exerting a torque against the drive end piece. The torque twists the flexible drive shaft about the rotation axis, thereby loading the flexible drive shaft with torsion, e.g., torsion 110 (shown in FIG. 1), as shown with box 242. Once a predetermined torsion is applied to the flexible drive shaft by offsetting the drive end piece relative to the shell by a predetermined amount of angular rotation, the drive end piece is fastened to the shell, as shown in box 250, retaining internally the torsional load applied to the flexible drive shaft. Fastening fixes the rim of the drive end piece flexible member to the drive-end flange of the shell.

Once the rim of the drive end piece flexible member is fastened to the drive-end flange of the shell with the flexible drive shaft internally loaded in torsion, the test arrangement can be loaded in the test stand, e.g., test stand 10 (shown in FIG. 1), and subjected to the conditions appropriate for the testing and/or qualification of the drive shaft. In this respect the test arrangement can be rotated at a predetermined rotational speed on the test stand, as shown with box 280. The flexible drive shaft can also be subjected to a predetermined amount of axial misalignment, as shown by box 260, such as be displacing one of the drive end piece and the driven end piece relative to the other of the drive end piece and the driven end piece. Alternatively (or additionally), the flexible drive shaft can be subjected a predetermined amount of angular misalignment, as shown by box 270. The angular misalignment can be realized by shifting one of the drive end piece and the driven end piece in a direction orthogonal relative to the rotation axis.

Flexible drive shafts are commonly employed to transmit power while subjected to axial and angular misalignments at high speed in helicopters, fighter aircrafts, ships and power plants. In order to demonstrate reliability, testing can be necessary. In some applications testing can require subjecting the flexible drive shaft to all loading conditions in a test cell, and not on the contemplated application platform for the flexible drive shaft. Accordingly, provisioning is required to generate the application loads on the flexible drive shaft to demonstrate reliability.

It is easy to mount a flexible drive shaft and rotate the flexible drive shaft at the rotational speed of the contemplated application. Axial misalignment (i.e. stretch) can be induced by translating a bearing along the rotation axis. Angular misalignment can also be induced by moving the bearing in a direction perpendicular to rotation axis. Application of torque can require employment of second test stand to externally apply torque to the flexible drive shaft, or by employment of a specialized test stand capable of providing external torque as well as the rotational speed, axial misalignment and angular misalignment expected in the contemplated application. One such test stand is the so-called 'four square' test stand, which employs hydraulic power and gearboxes to simulate operational conditions in a contemplated application.

In embodiments shell 108 is employed to facilitate the application of torque. Shell 108 is relatively compact, lightweight, and requires little space and power to operate. Shell 108 allows a flexible drive shaft, e.g., flexible drive shaft 18 (shown in FIG. 1), disposed within shell 108 to be torqued with flexible drive shaft 18 assembled within the interior of shell 108. In certain embodiments, flexible drive shaft test arrangement 100 additionally includes a drive end piece 104 and a driven end piece 106 each having a flexible member, e.g., flexible member 124, welded to a sleeve 122 with a female spline 130. A radially outer surface of spindle 126 sleeve has a male spline 132 that receives female spline 130, and drive end piece 104 and driven end piece 106 is fixed to shell 108 with fastener pattern 140. It is contemplated that torque be applied to flexible drive shaft 18 through drive end piece 104 with drive end piece 104 rotatably free relative to shell 108, which loads flexible drive shaft 18 with torsion, and the end piece then rotationally fixed relative to shell 108. This internally loads flexible drive shaft 18 with torsion 110 in a static state, eliminating the need for an external source of torque.

Once torsion 110 is applied to flexible drive shaft 18, and drive end piece 104 fixed to shell 108, flexible drive shaft test arrangement 100 can be installed on test stand 10 and flexible drive shaft 18 subjected the operational conditions of the contemplated application. For example, once flexible drive shaft test arrangement 100 installed on test stand 10, a parallel offset (accommodated by either or both drive-end piece 104 and driven-end piece 106 while fixed shell 106) can be applied by moving one of drive-end bearing 14 and driven-end bearing 16 supporting flexible drive shaft test arrangement 100 in a direction with component perpendicular to rotation axis 102 to subject flexible drive shaft test arrangement 100 to angular misalignment 30. The flexible drive shaft 18 can be rigidly connected to drive end piece 104 and driven end piece 106 and flexible drive shaft 18 subjected to axial misalignment, such as by insertion of axial spacers or washers between shell 108 and one of drive end piece 104 and driven end piece 106. Flexible drive shaft test arrangement 100 can be rotated at the application rotational speed, flexible drive shaft 18 thereby being subjected to each of the four operational conditions without use of an external source of torque.

In certain embodiments, flexible drive shaft test arrangement 100 can be tested with coincident application of torque, angular misalignment, axial misalignment, and rotational speed to simulate all application operating conditions in a single test event. As will be appreciated by those of skill in the art in view of the present disclosure, testing with coincident application of torque, angular misalignment, angular misalignment, and rotation at the contemplated application rotational speed can eliminate the need for two or more tests to validate a design through the test of a single test article, e.g., flexible drive shaft 18. As will also be appreciated by those of skill in the art in view of the present disclosure, flexible drive shaft test arrangement 100 can reduce the time required for tests to completely subject flexible drive shaft 18 to all operational loads. Moreover, flexible drive shaft test arrangement 100 as described herein can reduce the need for capital intensive, complicated test facilities that otherwise require a hydraulic power source.

The methods and systems of the present disclosure, as described above and shown in the drawings, provide for flexible drive shaft test arrangements, test stands, and methods of testing flexible drive shaft arrangements with superior properties including internal application of torsion to the flexible drive shaft, reducing the size, complexity and/or cost of the test stands utilized for testing flexible drive shafts. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexible drive shaft test arrangement, comprising:
   a drive end piece arranged along a rotation axis;
   a driven end piece axially offset from the drive end piece along the rotation axis; and
   a shell connecting the drive end piece to the driven end piece, and
   a flexible drive shaft engaged between the drive end piece and the driven end piece with the shell internally loading the flexible shaft in torsion.

2. The flexible drive shaft test arrangement as recited in claim 1, wherein the shell has a tube body with shell flanges arranged at axially opposite ends of the tube body.

3. A flexible drive shaft test arrangement, comprising:
a drive end piece arranged along a rotation axis;
a driven end piece axially offset from the drive end piece along the rotation axis; and
a shell connecting the drive end piece to the driven end piece, the drive end piece offset in rotation about the driven end piece to internally load a flexible drive shaft disposed within the shell with torsion, wherein the drive end piece includes a flexible member configured to connect to the shell.

4. The flexible drive shaft test arrangement as recited in claim 3, wherein the flexible member includes a flexible diaphragm extending about the rotation axis and connected to the shell at a radially outer rim portion of the flexible diaphragm.

5. A flexible drive shaft test arrangement, comprising:
a drive end piece arranged along a rotation axis;
a driven end piece axially offset from the drive end piece along the rotation axis; and
a shell connecting the drive end piece to the driven end piece, the drive end piece offset in rotation about the driven end piece to internally load a flexible drive shaft disposed within the shell with torsion, wherein the drive end piece includes a drive flange, the drive flange axially offset from an axial end of the shell.

6. The flexible drive shaft test arrangement as recited in claim 5, wherein the drive flange is disposed outside of the shell.

7. The flexible drive shaft test arrangement as recited in claim 5, wherein the drive flange is disposed within the shell.

8. A flexible drive shaft test arrangement, comprising:
a drive end piece arranged along a rotation axis;
a driven end piece axially offset from the drive end piece along the rotation axis; and
a shell connecting the drive end piece to the driven end piece, the drive end piece offset in rotation about the driven end piece to internally load a flexible drive shaft disposed within the shell with torsion, wherein the drive end piece includes a spline.

9. The flexible drive shaft test arrangement as recited in claim 8, wherein the spline is disposed outside of the shell.

10. The flexible drive shaft test arrangement as recited in claim 8, a male portion of the spline extends outward.

11. The flexible drive shaft test arrangement as recited in claim 8, a female portion of the spline is arranged outside of the shell.

12. A flexible drive shaft test arrangement, comprising:
a drive end piece arranged along a rotation axis;
a driven end piece axially offset from the drive end piece along the rotation axis; and
a shell connecting the drive end piece to the driven end piece, the drive end piece offset in rotation about the driven end piece to internally load a flexible drive shaft disposed within the shell with torsion, further comprising a flexible drive shaft arranged along the rotation axis and within the shell.

13. The flexible drive shaft test arrangement as recited in claim 12, wherein the drive end piece couple and the driven end piece couple the flexible drive shaft to the shell, the drive end piece rotationally offset from the driven end piece to load the flexible drive shaft with torque.

14. The flexible drive shaft test arrangement as recited in claim 12, wherein the flexible drive shaft includes a flexible coupling having a plurality of flexible diaphragm disks axially stacked along the rotation axis and connected to one another at radially outer rim portions.

15. The flexible drive shaft test arrangement as recited in claim 12, wherein the flexible drive shaft includes a drive flexible coupling connected to a driven flexible coupling by a shaft.

16. A test stand for flexible drive shaft, comprising:
a flexible drive shaft test arrangement as recited in claim 1;
a flexible drive disposed within the shell, internally loading the flexible drive shaft with torsion;
a rotation source operably connected to the flexible drive shaft and configured to rotate the a flexible drive shaft test arrangement about the rotation axis; and
a bearing arrangement rotatably supporting the flexible drive shaft arrangement, the bearing configured to subject the flexible drive shaft to at least one of an axial misalignment and an angular misalignment.

17. A flexible drive shaft test arrangement, comprising:
a drive end piece arranged along a rotation axis;
a driven end piece axially offset from the drive end piece along the rotation axis; and
a shell connecting the drive end piece to the driven end piece, the drive end piece offset in rotation about the driven end piece to internally load a flexible drive shaft disposed within the shell with torsion,
a flexible drive shaft test arrangement as recited in claim 1;
a flexible drive disposed within the shell, the internally loading the flexible drive shaft with torsion;
a rotation source operably connected to the flexible drive shaft and configured to rotate the a flexible drive shaft test arrangement about the rotation axis; and
a bearing arrangement rotatably supporting the flexible drive shaft arrangement, the bearing configured to subject the flexible drive shaft to at least one of an axial misalignment and an angular misalignment, wherein the flexible drive shaft is rotationally fixed relative the driven end piece, wherein the flexible drive shaft is rotationally fixed relative to the drive end piece, and wherein the driven end piece and the drive end piece are each rotationally fixed relative to the shell, the drive end piece being offset in rotation about the rotation axis relative to the driven end piece to exert a torsional load on the flexible drive shaft.

18. A method of testing a flexible drive shaft, comprising:
offsetting a drive end piece relative to a driven end piece about the rotation axis to apply torsion to a flexible drive shaft disposed within a shell that connects to the drive and piece and the driven end piece; and
fixing the drive end piece in rotation about the rotation axis relative to the driven end piece to retain the applied torsion in the flexible drive shaft.

19. The method as recited in claim 18, further comprising at least one of rotating the test arrangement about the rotation axis, subjecting the flexible drive shaft to axial misalignment, and subjecting the flexible drive shaft an angular misalignment.

* * * * *